(12) United States Patent
Hinckley et al.

(10) Patent No.: US 7,817,991 B2
(45) Date of Patent: Oct. 19, 2010

(54) DYNAMIC INTERCONNECTION OF MOBILE DEVICES

(75) Inventors: Ken Hinckley, Kirkland, WA (US); Raman Sarin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 731 days.

(21) Appl. No.: 11/511,718

(22) Filed: Aug. 29, 2006

(65) Prior Publication Data

US 2007/0191028 A1 Aug. 16, 2007

Related U.S. Application Data

(60) Provisional application No. 60/772,950, filed on Feb. 14, 2006.

(51) Int. Cl.
*H04M 3/42* (2006.01)
*H04M 3/10* (2006.01)
*H04W 24/00* (2009.01)

(52) U.S. Cl. .................. 455/416; 455/418; 455/456.3

(58) Field of Classification Search ............... 455/416, 455/456.3, 41.3, 418; 370/338, 341, 347; 707/100; 345/1.1
See application file for complete search history.

(56) References Cited

U.S. PATENT DOCUMENTS

| 5,812,865 | A | 9/1998 | Theimer et al. |
|---|---|---|---|
| 5,880,743 | A | 3/1999 | Moran et al. |
| 6,157,935 | A | 12/2000 | Tran et al. |
| 6,525,749 | B1 | 2/2003 | Moran et al. |
| 6,545,669 | B1 | 4/2003 | Kinawi et al. |
| 6,599,130 | B2 | 7/2003 | Moehrle |
| 7,006,881 | B1 | 2/2006 | Hoffberg et al. |
| 7,046,649 | B2 * | 5/2006 | Awater et al. ............... 370/338 |
| 7,162,509 | B2 | 1/2007 | Brown et al. |
| 7,200,530 | B2 | 4/2007 | Brown et al. |
| 7,200,559 | B2 | 4/2007 | Wang |
| 7,308,273 | B2 * | 12/2007 | Zhang ..................... 455/456.1 |
| 7,336,928 | B2 * | 2/2008 | Paalasmaa et al. ......... 455/41.2 |
| 7,512,889 | B2 | 3/2009 | Newell et al. |
| 7,533,189 | B2 | 5/2009 | Mahajan et al. |
| 7,636,794 | B2 | 12/2009 | Ramos et al. |
| 2002/0107008 | A1 * | 8/2002 | Hendrey et al. ............ 455/416 |
| 2002/0116205 | A1 | 8/2002 | Ankireddipally et al. |
| 2002/0184373 | A1 | 12/2002 | Maes |
| 2003/0105812 | A1 | 6/2003 | Flowers, Jr. et al. |

(Continued)

OTHER PUBLICATIONS

Hinckley, K. *Synchronous Gestures for Multiple Users and Computers*. USIT'03 Symposium on User Interface Software & Technology, 149-158.

(Continued)

*Primary Examiner*—Lester Kincaid
*Assistant Examiner*—Kuo Woo
(74) *Attorney, Agent, or Firm*—Christopher J. Volkmann; Westman, Champlin & Kelly, P.A.

(57) ABSTRACT

A method and apparatus for connecting two wireless devices to share information is disclosed. To connect the wireless devices the users communicate to each other a desire to connect their devices. Following this communication the users electronically identify each device, initiate and propose the connection. Once the connection has been made the users are able to share information across the devices. Alternative embodiments provide the user with expedited methods to identify the wireless device, identify the information to share, or provide additional security in forming the connection.

18 Claims, 11 Drawing Sheets

U.S. PATENT DOCUMENTS

| | | | |
|---|---|---|---|
| 2003/0145094 A1 | 7/2003 | Staamann et al. | |
| 2003/0222917 A1 | 12/2003 | Trantow | |
| 2004/0097195 A1* | 5/2004 | Selleck | 455/41.3 |
| 2005/0030255 A1 | 2/2005 | Chiu et al. | |
| 2005/0165795 A1* | 7/2005 | Myka et al. | 707/100 |
| 2006/0004834 A1* | 1/2006 | Pyhalammi et al. | 707/102 |
| 2006/0046709 A1 | 3/2006 | Krumm et al. | |
| 2007/0123235 A1* | 5/2007 | Newport et al. | 455/414.2 |

OTHER PUBLICATIONS

Rekimoto, J., Ayatsuka, Y., Kohno, M. *SyncTap: An Interaction Technique for Mobile Networking.* Mobile HCI 2003, Springer, 104-115.

Rekimoto, J., *SyncTap: synchronous user operation for spontaneous network connection.* Personal and Ubiquitous Computing, 2004.

Hinckley K., "Stitching: Pen Gestures that Span Multiple Displays", http://patrickbaudish.com/publications/2004-Hinckley-AV104-Stitching.pdf, Oct. 6, 2003.

Hinckley, K., "Bumping Object Together as a Semantically Rich Way Forming Connections between Ubiquitous Devices", UbiComp 2003 conference, Oct. 12, 2003.

Hinckley, K., Distributed and Local Sensing Techniques for Face-to-Face Collaboration (Short Paper), Proceedings of the 5th International Conference on Multimodal Interfaces, Vancouver, British Columbia, Canada, p. 81-84, Nov. 3-5, 2003.

\* cited by examiner

DYNAMIC INTERCONNECTION OF MOBILE DEVICES

The present application is based on and claims the benefit of U.S. provisional patent application Ser. No. 60/772,950, filed Feb. 14, 2006, the content of which is hereby incorporated by reference in its entirety.

BACKGROUND

The discussion above is merely provided for general background information and is not intended to be used as an aid in determining the scope of the claimed subject matter.

Mobile devices, such as personal information managers (PIMs), tablet PCs, cellular telephones, pagers, watches, and wearable computers typically include one or more buttons, touch screens, or active digitizers through which the mobile device receives explicit instructions from the user. Increasingly, mobile devices are being connected together via a wireless or wired network for purposes of communication, sharing of data and collaborative work.

Humans have evolved to function within a fabric of social connections and collaboration. People work on problems in groups, and indeed the entire field of computer-supported collaborative work (CSCW) is devoted to technological support of such groups. Many user tasks and activities revolve around communication, which inherently involves at least two persons. Furthermore, with the burgeoning use of the internet, and research trends in ubiquitous computing and distributed systems, human-computer interaction often involves more than one computer. Yet, there are few examples of real-time interaction techniques that leverage the simultaneous data streams generated by multiple users and multiple computers.

Establishing meaningful connections between devices is a problem of increasing practical concern for ubiquitous computing. Wireless networking and location sensing can allow devices to communicate and may provide information about proximity of other devices. However, with many devices nearby, how a user specifies which devices to connect to remains a problem. Furthermore, connections require semantics: What is the connection for? Is the user collaborating with another user? Is the user combining the input/output resources of multiple devices to provide increased capabilities? Presently, there exists a lack of techniques to intuitively form semantically rich connections between devices.

There are also relatively few techniques for forming distinguished connections between multiple devices. One prior art technique is "Smart-Its Friends". Smart-Its Friends allows a user to connect a pair of accelerometer-augmented handheld devices be holding the two devices together and shaking them. An identical pattern on the accelerometers suggests a shared context between the devices. The paper suggests using this to form a dedicated connection between the two shaken devices: if a "friend" device enters or leaves proximity, the user's device beeps, thus creating "a sense of awareness" of the comings and goings of other users. One problem with Smart-Its Friends is that only this one type of connection can be formed.

Another prior art technique for forming distinguished connections between multiple devices is "ConnecTables". ConnecTables are wheeled tables with mounted LCD displays that can be rolled together so that the top edge of two LCD's meet. The devices then recognize one another through a radio frequency identification (RFID) tag and RFID reader mounted on each device. The displays can only be joined at the top edge (i.e., when the face one another). When joined, two ConnecTables create a shared workspace in which users can pass objects back and forth. With ConnecTables, other types of connections between the two display devices are not supported. Further, since the displays are part of the furniture and cannot be picked up, fluid transitions between shared work and private or semi-private work is not possible.

Much recent discussion has focused on the promise of the wireless internet, yet there has been relatively little work on techniques that help users of mobile devices to collaborate with others and to share information with other persons. For example, when attempting to copy a file between mobile devices, it remains difficult for users to name a device to connect to, specify how to connect, or indicated what information to share.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

A method of connecting two mobile phones (or other wireless devices) is disclosed. In various embodiments the users of the two phones communicate that they wish to form a connection between each other to share information. Once they have proposed to each other that they wish to form a connection, an application program on each phone is activated to facilitate the connection.

The application program allows the users to identify the device they want to connect to. Various embodiments provide different methods of identifying the device to connect to. Once that device has been identified, the user can key in a pass code to ensure that they are the only ones connecting to each other. Once the connection is formed, the user can transmit information between the phones. In some embodiments the users can transmit contact information about themselves. In other embodiments the users can transmit other types of information. Additional embodiments allow the users of the application program to display an image across the multiple displays.

In some embodiments the user can chose to transmit to the other user, as the information, a virtual business card that contains some of his/her contact information. This business card is created by defining in the application program what information is to be included in the business card. This allows the user to update their contact details without having to manage a number of contacts for themselves.

DETAILED DESCRIPTION

Figure 1:
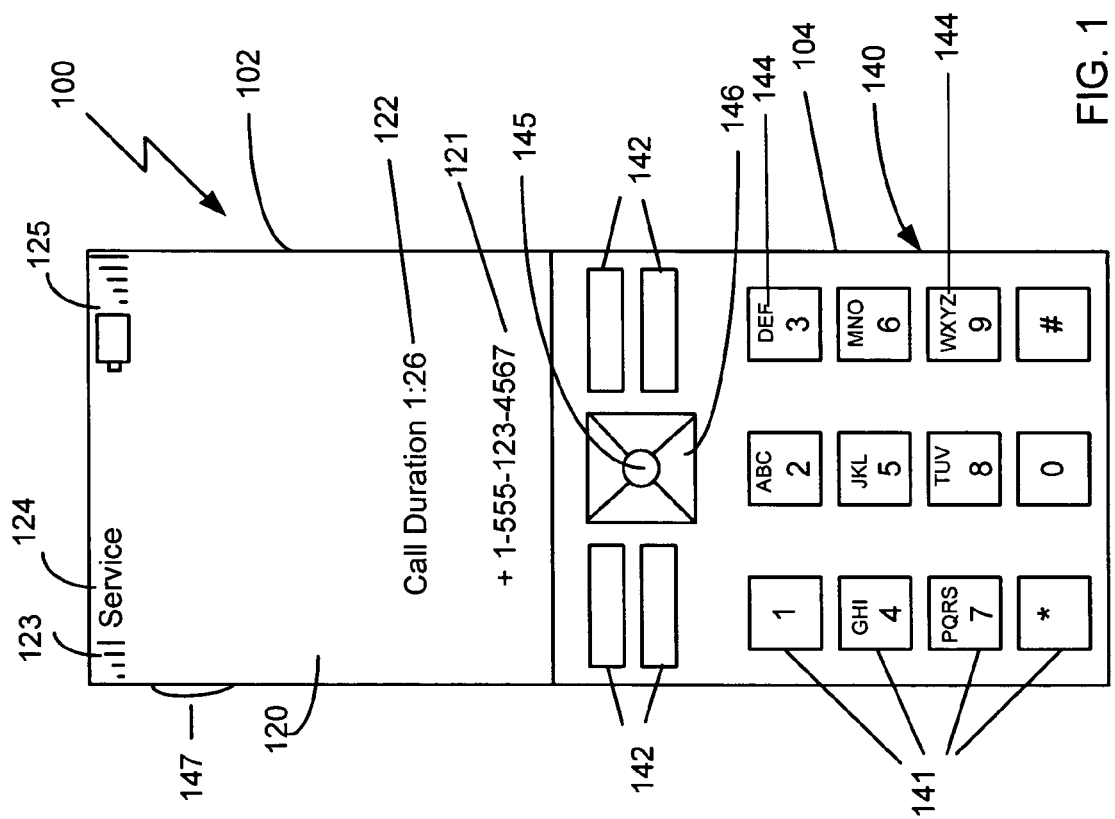
FIG. 1 is a block diagram of a mobile phone according to one embodiment.

FIG. 1 is a block diagram of a mobile phone in which the various embodiments will be discussed. While the discussion of the present embodiments will relate to a mobile phone, those skilled in the art will readily recognize that the features discussed can be applied to other mobile devices.

Mobile phone 100 is a device used for communicating information either by voice or through an information exchange. These information exchanges can take place through the use of short message service (SMS), text messaging, e-mail, file transfers or any other method of transferring date from one device to another device.

Mobile phone 100 also includes an operating system. In one embodiment, the operation system is Windows Mobile distributed by Microsoft Corporation of Redmond, Wash. However, in other embodiments, other operating systems can be used. For example, Symbian S60, Palm OS or any other operating system found on a mobile device can be used. Further it should be noted that the operation of the present embodiments is not dependent on the actual operating system that is present on the mobile phone 100 or other mobile devices.

Mobile phone 100 is, in some embodiments, divided into several portions. These include a top portion 102 and a bottom portion 104. The top portion 102 of the mobile phone 100 includes a display 120. Display 120 displays to the user a variety of information. For example, when used as a mobile phone, the display 120 can show the user the number 121 that have been entered, such as when dialing a phone number, the duration 122 of the current call, the signal strength 123, the name of the carrier 124 the phone 100 is connected to, and the battery life remaining 125. Additionally, display 120 can display features that are available through the operating system, such as menu options. However, other information can be displayed on display 120. In some embodiments, display 120 can be touch sensitive. In these embodiments the user can navigate or select menu options by touching the display 120.

The bottom portion 104 of mobile phone 100 includes a number of subsections. A first subsection is keypad 140. In one embodiment, the keypad 140 includes a numeric keypad having the numbers 0-9, # and * on respective keys 141. Further, each key may have an associated set of alphabetic characters 144 associated with a number of the keys 141. The layout of these keys 141 can, in one embodiment, be a standard numeric keypad layout typically found on most phones. However, in other embodiments, the keypad may be a QWERTY keypad, any other keypad that is provided in a mobile device, or may be implemented such as in devices that place the keypad functions on the display. Additionally, bottom portion 104 may have a number of soft keys 142 located near the top portion 102. These soft keys 142 can allow the user the ability to access options that are displayed in an area of the display 120 corresponding to the location of the soft key on the bottom portion 104.

In some embodiments, the bottom portion 104 has a pointer 145. Pointer 145 allows the user to interface with information displayed on the display 120. Near the pointer 145, there can be additional keys 146 that provide additional features of navigation on the display 120 or provide quick access to frequently used applications. Alternatively, in some embodiments navigation can be achieved through the use of a scroll wheel 147. Scroll wheel 147 can be located on the side of the mobile device 100. When a scroll wheel is used for navigation, the display 120 can highlight the various applications in response to movement of the scroll wheel 147.

Figure 2:
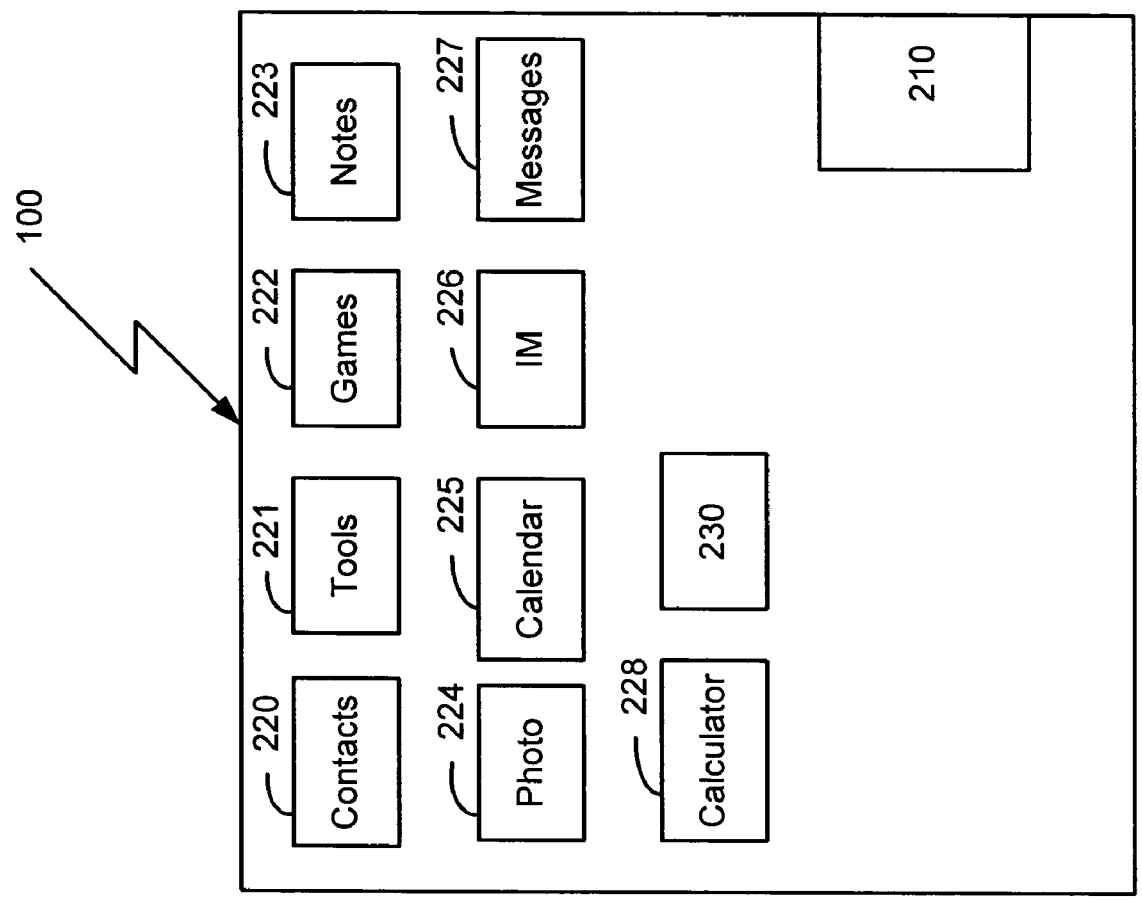
FIG. 2 is a block diagram illustrating components found inside an illustrative mobile device.

FIG. 2 is a block diagram illustrating components found inside the mobile device 100. Device 100 has one or more wireless communication components 210, a number of application programs 220-228 and connection application or service 230.

The wireless communication component 210 allows the mobile device to communicate with other devices without having a physical connection to the device. This wireless communication component 210 can take the form of many different protocols, including infrared (IR), Bluetooth, and wireless local area connection (WLAN). However, other formats for wireless communication can be present on device 100. Further, in some embodiments, the mobile device 100 can have a plurality of wireless communication protocols. Furthermore, the interaction techniques are not limited to wireless devices, but could be utilized link multiple devices with wired and/or wireless connections.

Applications programs 220-228 are, in various embodiments, a variety of programs that allow the user of the mobile device 100 to perform many tasks. These applications 220-228 can include such applications as an address book, games, calculator, photo viewer, word processor, calendar, etc. This list of applications is for exemplary purposes only, and other embodiments may have more or less applications present on the mobile device. Further, in some embodiments, the user of the mobile device may add additional applications to the mobile device 100 to customize the device 100 to their needs.

Application program 230 is a special program that is provided on the mobile device 100 to enable the user to easily connect to and share information with another mobile device. While application program 230 is referred to as a program, those skilled in the art will readily recognize that program 230 could be a service, an API or other similar application or code on the mobile device 100. For example, in some embodiments program 230 might not be an application, but rather a service layer provided by the operating system or may run as a background process that applications could utilize to initiate user-driven communication with remote devices. The process of the connection and sharing is discussed in greater detail below with respect to FIGS. 3-10.

Figure 3:
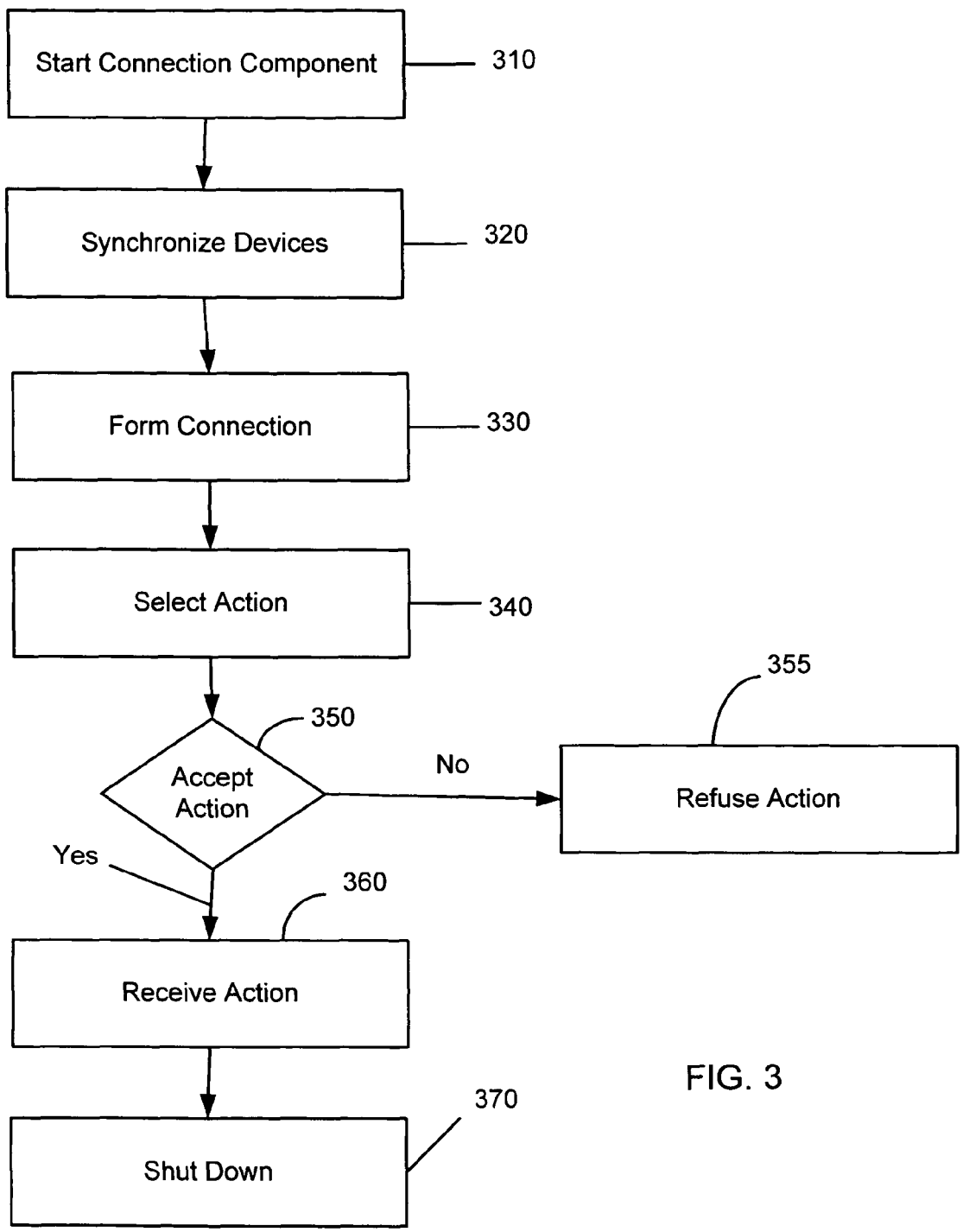
FIG. 3 is a flow diagram illustrating the steps executed when forming a connection and transmitting information between two mobile devices through a wireless connection.

FIG. 3 is a flow diagram illustrating the steps executed by the application program 230 when forming a connection and transmitting information between two mobile devices through a wireless connection. For the purpose of this discussion, it will be assumed that both mobile devices are communicating through the Bluetooth protocol and have the associated limitations that are present in the Bluetooth protocol. However, in other embodiments where the connection occurs using different protocols, portions of this discussion that apply to Bluetooth (or are Bluetooth specific) may not be wholly applicable to these other connection protocols.

To generate a connection between the two mobile devices, a series of steps are performed. FIG. 3 illustrates the steps executed according to one embodiment. In general, the steps executed are start 310, synchronize 320, connect 330, select action 340, accept/decline 350, receive 360, and shutdown 370. In some embodiments, alternative arrangements or omissions of certain steps are possible. For example, it may not be necessary to explicitly perform an extra step to "start" the connection service if the user is already in an application or screen that supports it. Similarly, in some instances the user may select the desired action prior to initiating the synchronization or connection steps, or it may not be necessary to accept/decline a connection in some usage scenarios.

Figure 4:
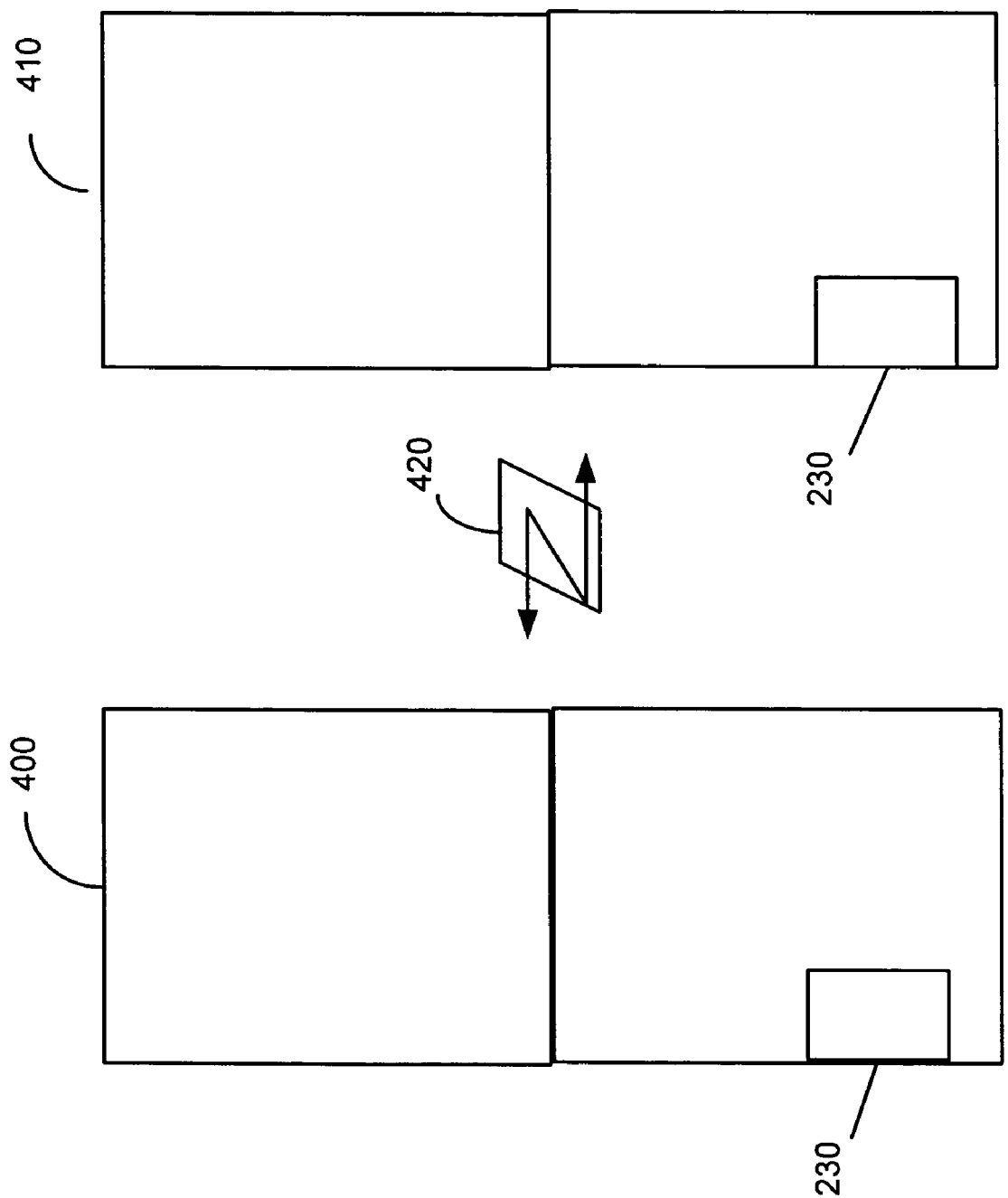
FIG. 4 is a block diagram illustrating the connection of two mobile devices together.

FIG. 4 is a block diagram illustrating the connection of two mobile devices together. Devices 400 and 410 are mobile devices configured to communicate with each other. The mobile devices 400, 410 are similar to mobile device 100 discussed in FIG. 2. Each device 400, 410 has an application program 230 that facilitates the communication and connection process discussed above. Element 420 illustrates the transfer of data between the two devices.

A brief description of the process illustrated in FIG. 3 is provided here. A more detailed description for each step is provided later. At the Start step 310, each device 400, 410 must be running the associated application 230. In the event that the wireless protocol is not activated, the application 230 activates the protocol at this step. At the Synchronize step 320, one of the users presses a numeric key from 0-9. In other embodiments any button or key on device 400 can be used. The user of the other device also presses the same key at about the same time. In some embodiments, users would verbally coordinate which key to press. At the Connect step 330, each user simply waits for the devices to automatically discover one another. In some embodiments, to speed the connection process or to indicate the desire for an asymmetric connection (where one user is explicitly identified as the sender, the other as the receiver), one of the users can press a button or soft key. In some embodiments this identifies that user's device as the client.

At the Select Action step 340, once the mobile devices 400, 410 have established a connection, an action screen appears on each device. In some embodiments the actions which are offered on each device may depend on the types of devices being connected. For example, linking a cell phone and a GPS receiver may offer actions tailored to location-based services, navigation, and mapping. Furthermore, each device may not necessarily offer the same actions. For example, the GPS system might offer an action to send the current latitude/longitude to the phone, but the phone might not have a corresponding function on it to make use of this feature. This screen shows options that the two connected devices may share information or resources. Either user, or both users, may initiate any of the actions. During the Accept/Decline step 350, following one user initiating an action, in some embodiments the other user is offered the opportunity to accept or refuse the results of that action. For example, the user may be shown a thumbnail of an image offered by the other user. The receiving user may be presented with a Yes/No option to receive the image. At the Shutdown step 360, upon exiting, the application automatically closes the connection and reverts the connection protocol on the device 400, 410 to its previous state.

The process discussed briefly above does not require the user to know how the connection protocol works. For example, it is not necessary for the user to know how Bluetooth works, the names or addresses of the devices involved, or any other technical information. Application 230 integrates many different possible cross-device operations into a single interaction model. Thus, the application 230 is easy for users to understand while powerful enough to provide many capabilities that users desire.

Referring now to the start step 310, in some embodiments, the application 230 runs as a background process that responds to particular key presses. In other embodiments, the user can access the application 230 through a menu system or other navigation component. In one embodiment where the application 230 is accessed through a single key press, the user presses the # key. However, any other key can be used. The mobile device 100 can in some embodiments automatically attempt to discover another device that has experienced a nearly simultaneous key press. In other embodiments, the device 400 can wait to receive an indication that there is another device in proximity to the device.

At the Synchronize step 320, the users are attempting to link their devices 400, 410. There is a potential of having many different devices with an open connection as well as attempting to connect to other devices, it may be necessary to identify the devices so that they can synchronize together. In one embodiment, the users select a single numeric key on the keypad to designate the devices 400, 410 that are to be connected. Alternatively, users can press different numeric keys or a combination of keys as a more secure connection mechanism. For example, each user could key in the numbers 7 1 0 9 on their respective keypads as a private key to enable the synchronization of the devices. In some embodiments, the users can verbally communicate to each other what the key is. In other embodiments the users can communicate the keys by other methods. In further embodiments, the connection may require the devices to possess valid certificates (e.g. obtained previously by employees working for the same company), or the devices may exchange public encryption keys to secure the connection.

There are two methods used for generating the connection at step 330. The first is automatic discovery and the second is explicit connection. One of the current limitations of Bluetooth technology is the need for one of the devices to be designated a "server" and the other devices to be designated as "Client" devices. However, other communication protocols may not have this limitation.

For the automatic discovery process, in one embodiment, the device with the lowest Bluetooth address or unique device ID becomes the server. However, in other embodiments the device with the highest address can be used as the server. For the explicit connection process, in one embodiment, the device that does not see a key press defaults to being the 'server'. That is, it simply continues waiting for another device to discover it. Again, the need to designate a server is a Bluetooth limitation, but some user tasks may benefit from having the ability to explicitly identify the directionality of the connection (server vs. client).

A Bluetooth connection can be established more quickly in the explicit process as each device knows its designated role (client/server). Alternatively, in some embodiments the devices randomly interleave brief periods where each acts as server or client, until the two devices successfully discover one another. This process may take numerous tries because Bluetooth devices can transmit signals that allow other devices to discover them, or they can search for discoverable devices, but they cannot do both at the same time. In some embodiments, buttons, key presses or gestures can be used alone or in addition to any soft key to distinguish the client device.

Figure 5:
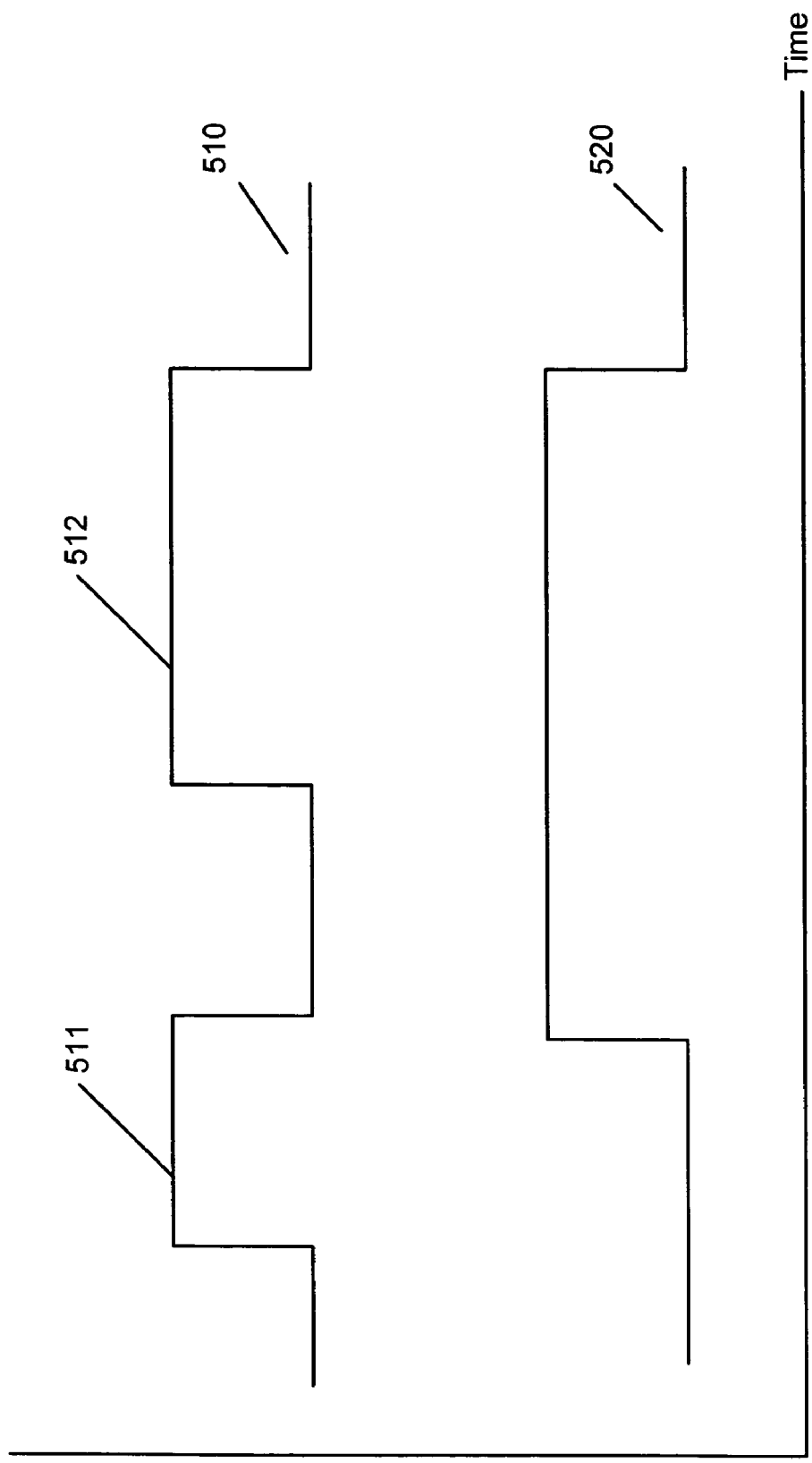
FIG. 5 illustrates an alternative method for connecting the devices.

FIG. 5 illustrates an alternative method for connecting the devices. FIG. 5 is a time graph illustrating the actions on the mobile devices 400, 410. The top line 510 represents the server device, and the bottom line 520 represents the client device. Further moving from left to right in the figure represents an increase in the time from the starting action.

For example, by pressing a numeric key twice, or tapping and then holding the key, represented by reference numbers 511 and 512, provide alternative ways to distinguish the client device are provided. This approach can be faster for advanced users, as the user does not have to move their fingers between the keys or buttons. Further, pressing the same key twice is a faster motion that requires little or no diversion of attention to the keypad.

Another method to speed up the connection process is for device 100 to search specifically for other device(s) with known addresses. For example, these addresses can be acquired via previous connection through application 230. In some embodiments, the user can choose a specific device. For example, the user may scan through a list of Favorite Devices or Recent Connected Devices. In other embodiments the device can even start by looking for these previous devices, but then default to the standard process discussed above for connecting to an unknown device if a 'known' device is not found.

Searching for a know device address can be advantageous in an environment with many discoverable devices. Without a list of known devices, the device 100 may have to query many other devices to determine which device is the desired one to connect with. Searching by address offers a procedure to ease interactions with known commonly used devices. In some embodiments, it is not necessary for the user interface to expose the address itself to the user. In those embodiments the address could be replaced with a thumbnail photograph of the device's user, the name of the device's owner. This information can in some embodiments, be exchanged the first time two devices discover one another as 'unknown' devices, or another non-address based method for disclosing the device. In some embodiments, the user can explicitly control this exchange by designating a connecting device as a "friend" device (or as a "stranger" device not to be trusted in the future). Some embodiments may require both users' consent before devices will allow pairing as "friend" devices.

This process can also designate one device as the client, and one device as a server. This speeds device discovery as once each device knows its role, it can advertise itself as discoverable, while the other device can allocate its time discovering the client device. In one embodiment, one of the users can perform an action such as pressing the # key and then a soft key for finding a partner device. In another embodiment the user can tap a numeric key associated with the desired operation twice in order to specify the device as the sender or initiating device. Due to current technical limitations of Bluetooth, having the users distinguish the server vs. client device up front can speed the discovery of the desired partner devices.

In some embodiments, the same keys can be used for both alphanumeric entry and for synchronization between the devices. For example, pressing and holding a key could be used to initiate a connection through application 230. This connection might also be held open only so long as one or both users hold down a button or key. This approach to forming connections can be useful for transient connections, and offer a procedure to explicitly control how long the other user has to respond. For example, if one of the devices received a connection after the first user lets go of the key, then that device could refuse the connection, as it is no longer open.

Once the connection has been established at step 330, the users can then select the actions they wish to perform between the two connected devices. These available actions may vary depending on the specific devices connected, as well as the context of use. For example, the time of day, where the phones are located, current phone profile, etc. Further, in some embodiments, multiple screens of actions or hierarchically nested actions may be available.

Once the two devices 400, 410 have discovered one another, the screen, in one embodiment, shows up to 12 icons arranged in a grid pattern. This grid pattern corresponds to the physical layout of the keypad of the phone, and activates the corresponding functions associated with the key press. This grid pattern may be, for example, a 3×3, a 4×4, or in a mini-qwerty keyboard arrangement depending on the keys available on each device and the number of operations that are being offered.

Figure 6:
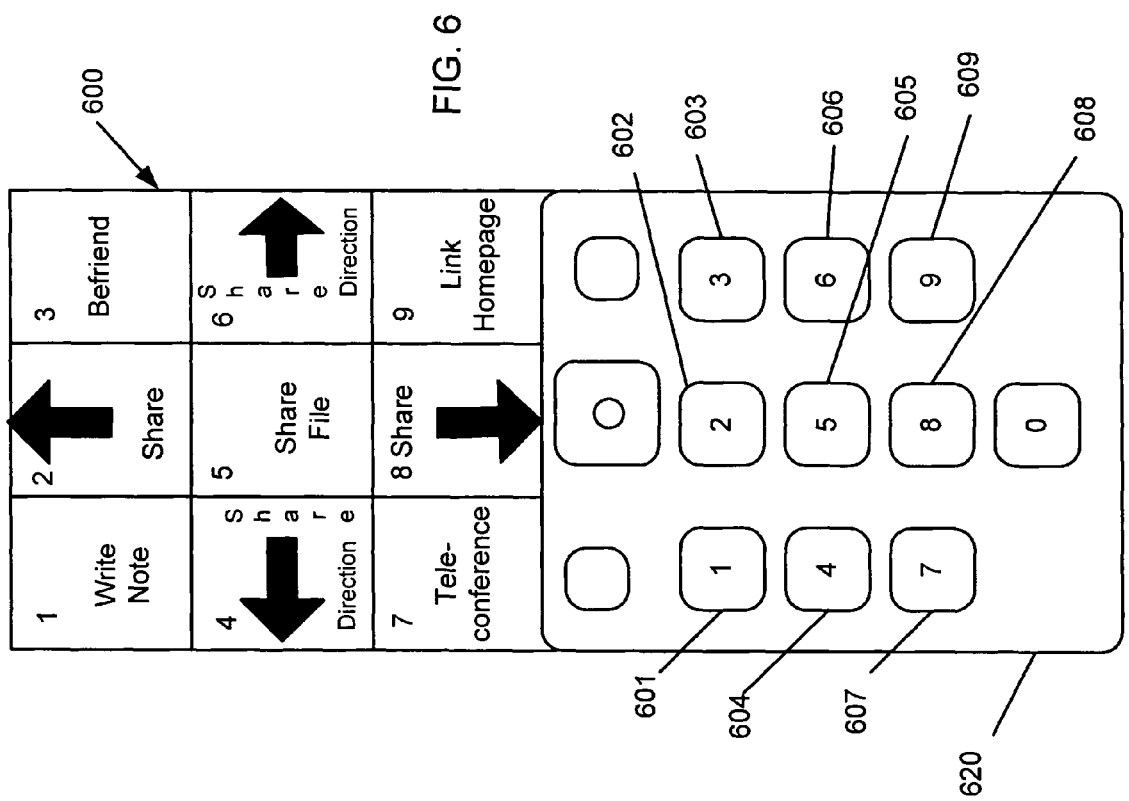
FIG. 6 illustrates an example screen having a grid system for navigation.

FIG. 6 illustrates an example screen having the grid 600 discussed above. References numbers 601-609 refer to the respective key presses or zones on key pad 620. The options that are displayed and presented in the grid 600 can vary. This may depend on the type of the devices the user is connecting to, or the user-specified settings on each device. In some embodiments, if a zone is empty, pressing the corresponding key can be ignored, can bring up a dialog to define a custom cross-device function, or can trigger a default action.

Figure 7:
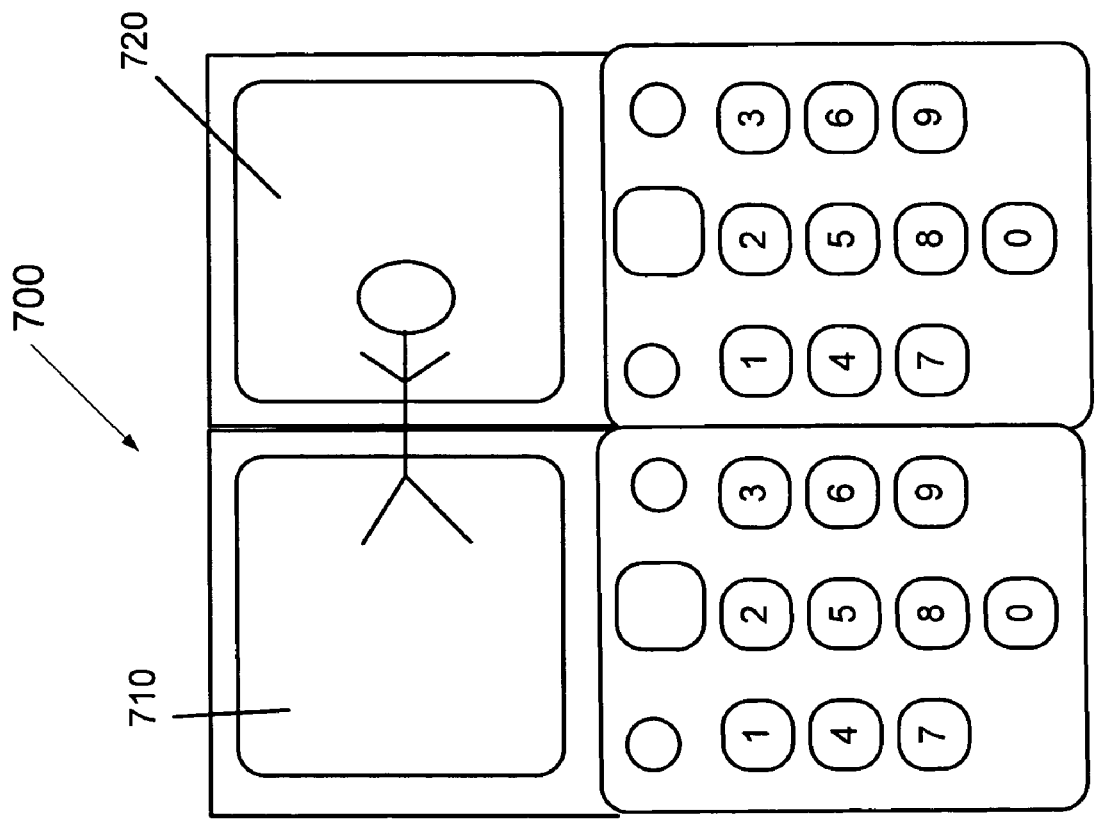
FIG. 7 is a block diagram illustrating an image displayed across two devices.

In one embodiment, it is possible to use the grid 600 to specify spatial parameters of the connection. For example, one user could share an image with another device such that the two devices show the selected image 700 across two screens 710, 720. This is illustrated in FIG. 7. In one embodiment, each user selects the direction of the other user using grid 600. This provides enough information for the system to rotate the portion of the image shown on each display to create the illusion of a cross-device tiled display.

Figure 8:
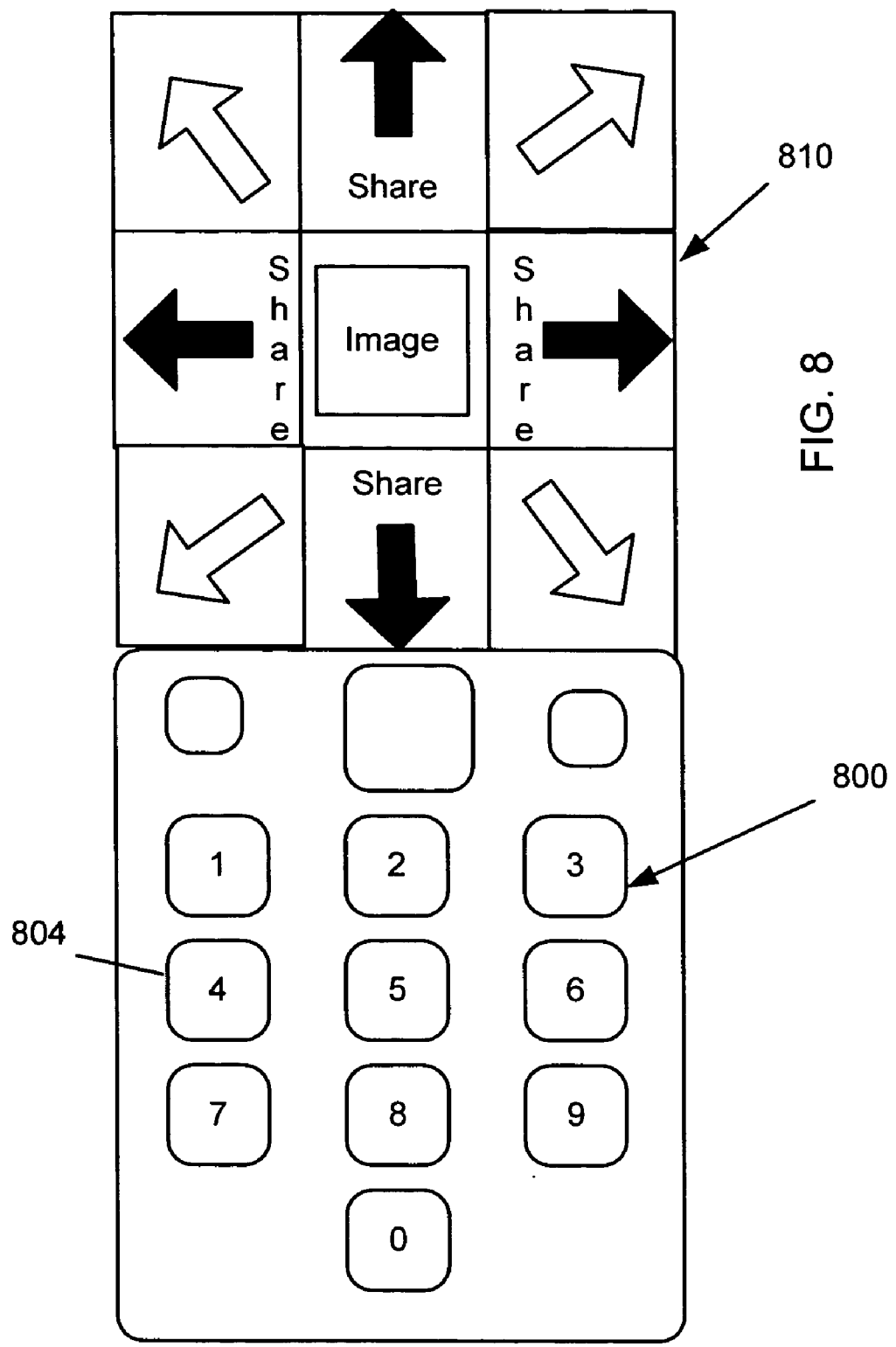
FIG. 8 is a screen shot illustrating a grid layout on a screen that allows a user to select the relative orientation of the device receiving the data.

FIG. 8 illustrates a grid layout that allows the user to select with keys 800 to specify the relative orientation of the device receiving the other portion of the image using grid 810. For example, by pressing the key 804, the image would appear two screens such that the second device is to the left of the device. This approach can, in other embodiments, be implemented by bumping the devices together and stitching the devices together. One example of stitching is illustrated in application Ser. No. 11/263,401, entitled "Distributed Sensing Techniques for Mobile Devices", the contents of which are hereby incorporated by reference in their entirety.

In another embodiment the device 100 is configured to determine the relative orientation or proximity of other devices. In these embodiments the grid 800 can be used to distinguish between the various proximal devices.

Figure 9:
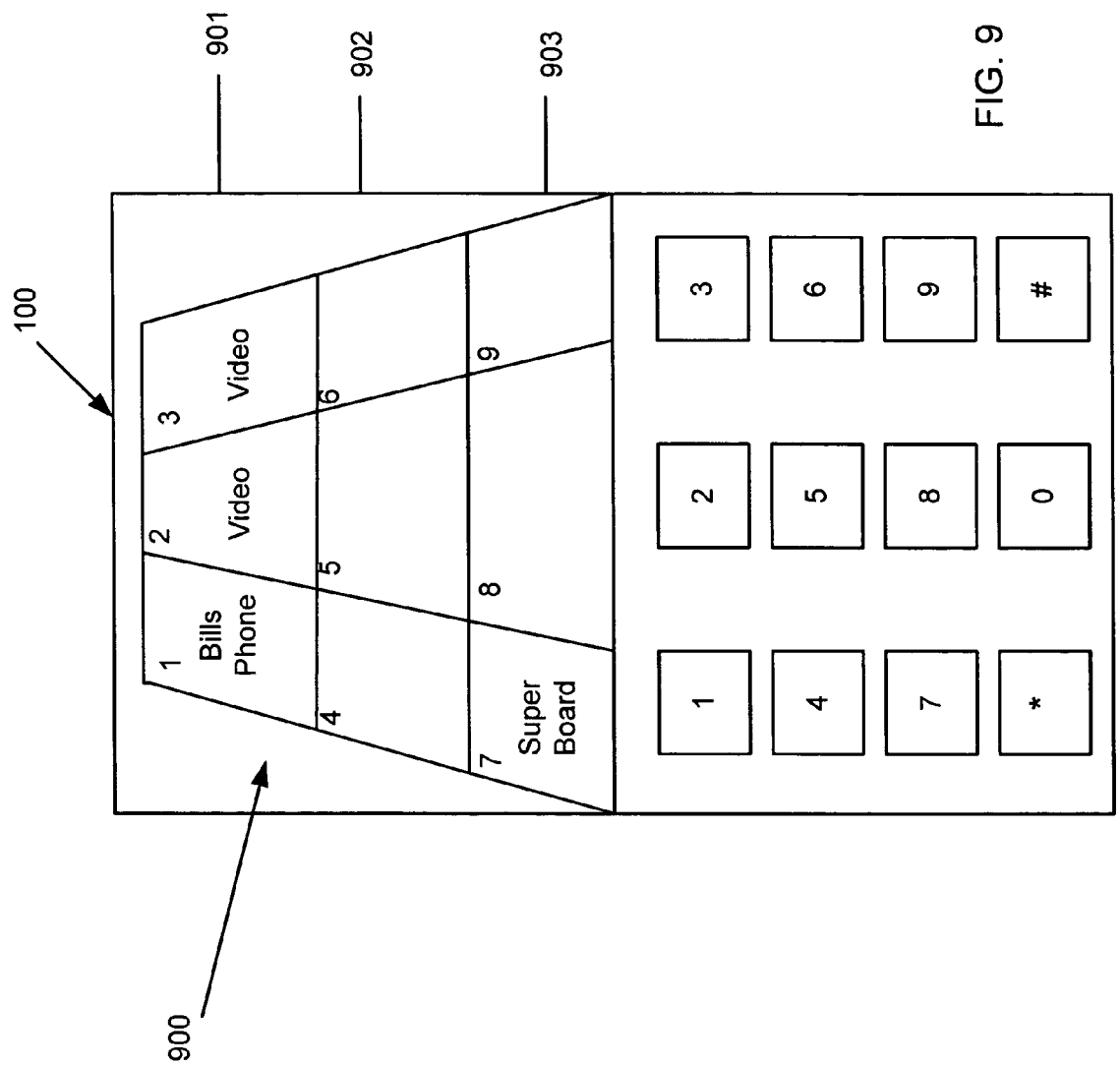
FIG. 9 is an illustrative screen shot of a display on a mobile device that shows the available devices by signal strength.

FIG. 9 illustrates, according to one embodiment, a screen on the device 100 that distinguishes the available devices by signal strength (weak 901, medium 902, strong 903), and presents them in a perspective view. This is illustrated by grid 900. This approach can make it easier to determine which of the nearby devices to connect to or use for a joint operation. However, in this embodiment, the other devices may be present which may not belong to a particular user (e.g., a projector or printer) and thus it may not be possible to perform a near simultaneous key press on the other device.

Figure 10:
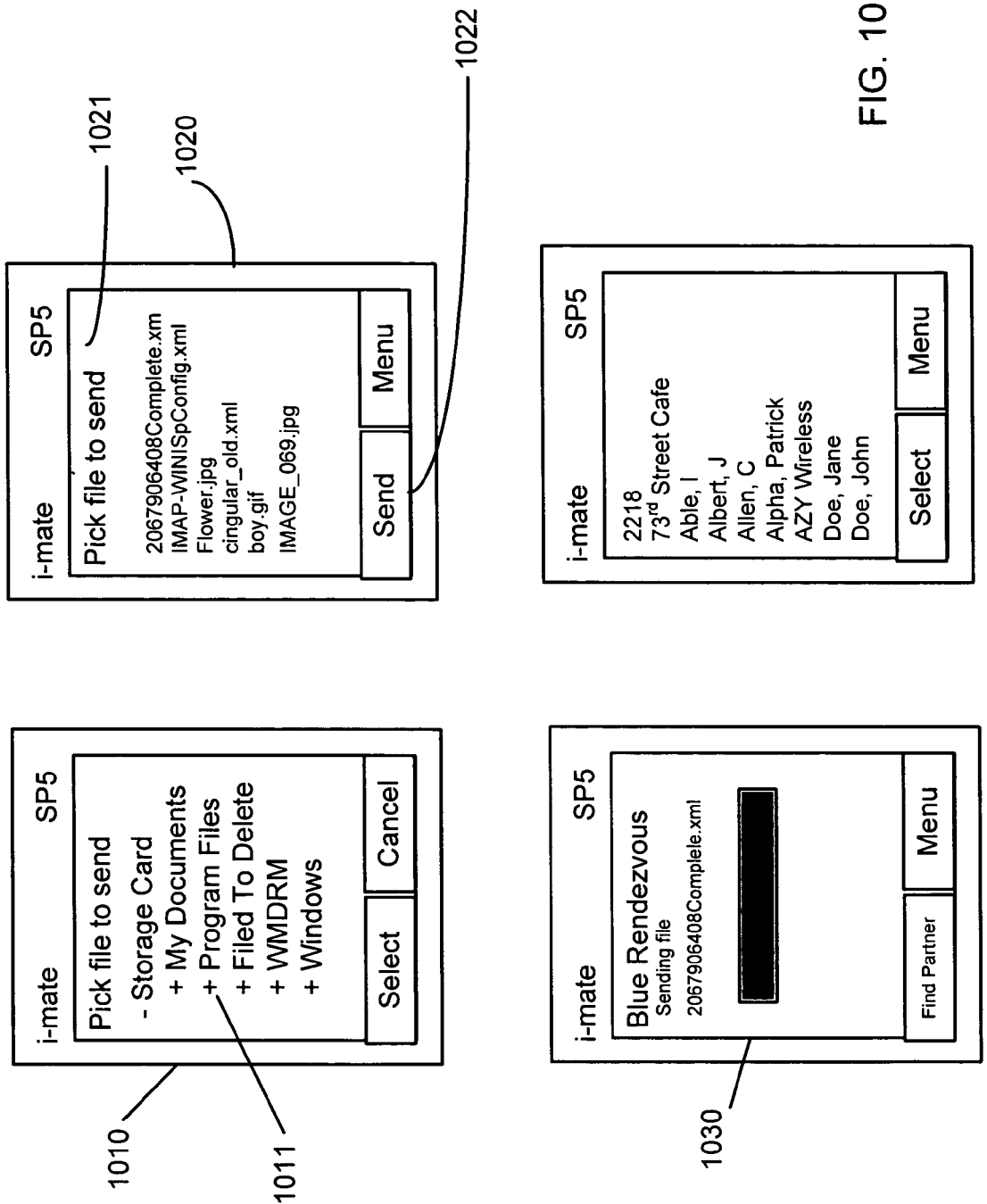
FIG. 10 is an example screen shot and process that allows a user to transmit a file from one device to another.

While selecting an action, the user may, in some embodiments, specify the scope of an action by forming selections prior to or as a consequence of selecting an action. For example, the user may choose one or more files to transmit to the other device. An example of this is illustrated in FIG. 10. At 1010, a file control displayed on screen allows the users to specify which file(s) to transmit from list 1011. At 1020 the user selects a file 1021 to send. The selection of the file 1021 can be done using the normal mode of selecting items on the mobile device 100. When the user presses a soft key associated with the Send icon 1022, a progress bar gives feedback on the transfer. This is illustrated at 1030.

In other embodiments, rather than using the standard folder and list controls of the mobile device 100, content selection controls are built on the above described grid interface approach. In this embodiment, one user can select a contact or file to send to the other device 410. For example, the user may select a contact to send by displaying on the screen the contacts in a contact list and assigning each contact a key on the keypad. This approach helps to emphasize which device is sending and which device is receiving. Simple feedback in this embodiment assists users in averting mistakes or erroneous connections, and is particularly helpful if both users initiate actions at the same time.

Referring back to FIG. 3, in the acceptance/refusal step 350, the receiving device's 410 user can decide whether to accept or reject the incoming information. In some embodiments, some actions may not offer any refusal. Further, some actions may offer an ongoing option to terminate the connection or undo the results of the operation.

In one embodiment, a user sees a thumbnail preview of the image of file name that another user is transmitting, and can choose whether or not to accept it (Yes/No). By selecting NO, the receiving user is stopping the transfer of information from the sending device. This is illustrated at step 355.

In other embodiments, at step 350, the user sees a small preview of the image or file. This allows the receiver to know exactly what they are agreeing to receive before they actually receive it. The receiving user can hit YES, or in some embodiments, simply wait, and the image or file will complete downloading. This is performed at the receipt step 360. In some embodiments, the information is pre-fetched while the system waits for the user to answer YES or NO. If the transfer is refused, the sender receives a feedback of the cancellation and can also choose to cancel the operation prior to its completion at step 355.

The final step is termination the connection at step 370. In some embodiments, the connection may be broken, and the radio also may be turned off, after completing an action, after a timeout, after the devices move beyond wireless range of one another, when one device enters a low battery power state, or upon explicit selection of a Disconnect command by either user. Further, other methods of ending the connection can be used.

An additional feature that is provided on the mobile device 100 in some embodiments is a virtual business card feature. The virtual business card feature is a feature that is contained within the application program 230.

In prior systems, when a user wished to share their contact information with another they were forced to provide complete contact information. If the user desired to provide less than their complete contact information, they would have to create a number of contacts for themselves for each different version of contact information they wanted to provide. For example, a user may want to give some people only their personal contact information, but not their business contact information. In other examples the reverse could be true. In both of these instances the user would create a number of contacts for themselves in the address book to meet each circumstance.

By having a number of contacts for the user, it becomes increasingly difficult to manage all of the information in them. For example, if the user needed to update a phone number for themselves, they would have to review each contact to determine if the number should be changed.

The virtual business card allows the user to define what information is to be transmitted with the contact depending on the situation. This contact is then transferred in some embodiments at step 360. To develop the virtual business card the user can be provided with a display, such as display 1100 illustrated in FIG. 11.

Figure 11:
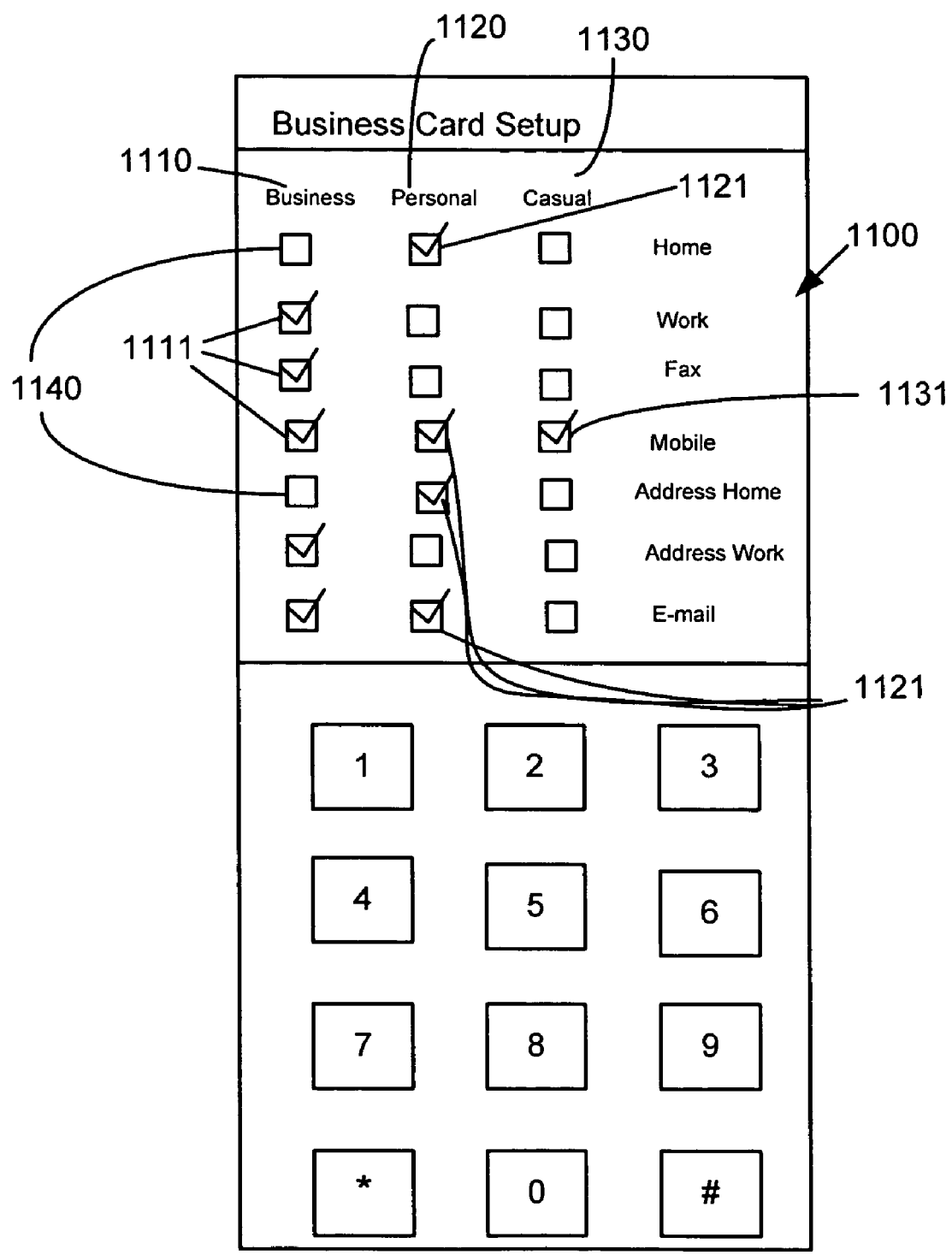
FIG. 11 is a screen shot illustrating a menu system for generating a virtual business card.

FIG. 11 illustrates an example of a menu system that can be used to generate the virtual business card according to one embodiment. On the display 100, the user is presented with a number of types of cards/contact information that they may wish to send. In this example the user can choose between business (indicated by 1110), personal (indicated by 1120) or casual (indicated by 1130) contacts to send. Under each of the categories is a series of checkboxes 1140. These checkboxes 1140 allow the user to define the portion of the contact that is transmitted with the contact version.

Using this method of identifying the information on the card and delineating the cards without having to create a separate contact for each type of contact information the user wishes to share has numerous advantages over the previous methods. In particular by only working with one contact entry the user can update information all at once and is not required to "remember" other contacts that contain the same information. A further benefit of this approach is that the user can easily vary the amount of information that can be sent with each contact type.

FIG. 11 also shows a number of the checkboxes 1140 checked to indicate which card the information is to be associated with. Checkmarks 1111 indicate the contact information that is to be sent with the business contact card 1110, checkmarks 1121 indicate the contact information that is to be sent with the personal card 1120, and checkmarks 1131 indicate the contact information to be sent with a casual contact card 1130.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of connecting at least two mobile devices together to enable the devices to share information across a wireless connection, the method comprising:

opening a wireless connection protocol on each of the at least two mobile devices;

proposing a shared wireless connection from a first one of the mobile devices to a second one of the mobile devices, the first mobile device having a first plurality of keys and the second mobile device having a second plurality of keys corresponding to the first plurality of keys, wherein proposing comprises:

pressing a first key sequence on the first mobile device, the first key sequence comprising the first plurality of keys pressed in a first order;

pressing a second key sequence on the second mobile device, the second key sequence comprising the second plurality of keys pressed in a second order;

determining whether the first order of the first key sequence pressed on the first mobile device is the same as the second order of the second key sequence pressed on the second mobile device and determining whether the first and second key sequences were pressed substantially simultaneously; and determining whether to form the shared wireless connection, wherein the shared wireless connection is formed between the first and second mobile devices if the orders of the first and second key sequences are the same and the first and second key sequences were pressed substantially simultaneously; and transferring information between the connected mobile devices through the wireless connection.

2. The method of claim 1 wherein transferring information comprises:

identifying the information on the mobile device to be shared;

pressing a key on one of the mobile devices; and transferring the information associated with the key from the first mobile device to the second mobile device.

3. The method of claim 2 further comprising, displaying on the receiving device an indication that information is to be received.

4. The method of claim 3 further comprising:

accepting or rejecting the receipt of the indicated information;

if accepting the information, allowing the indicated information to be received; and if rejecting the information, blocking the receipt of the indicated information.

5. The method of claim 3 wherein the indicated information is displayed as a preview of the actual information to be received.

6. The method of claim 1 further comprising:

generating a display, on a display portion of the mobile device of a selection menu;

creating on the display a plurality of sections, each section related to information that can be shared across the connection; and associating a key on the mobile device with each section in the plurality of sections, wherein each section has a different key.

7. The method of claim 1 wherein proposing the shared connection comprises:

displaying a list of devices that can be connected to;

selecting one of those devices to connect to; and proposing the connection to that device.

8. The method of claim 7 wherein displaying comprises:

displaying the list of devices in a manner that allows a users of the device to determine the relative distance to each device.

9. The method of claim 7 wherein displaying comprises:

displays the devices in a perspective view where closer devices are presented towards a bottom portion of the display and further devices are displayed towards a top portion of the display; and wherein the devices displayed towards the top portion of the display appear further away from the screen than devices displayed towards the bottom portion of the display.

10. A mobile device comprising:

a display device;

a keypad comprising a plurality of keys;

at least one wireless radio; and an application program that provides connectivity between the mobile device and a second mobile device when a given key on the keypad of the mobile device is simultaneously pressed with a corresponding given key on the second mobile device;

wherein the application program manages the connections between the mobile device and the second mobile device and promotes the transfer of information between the mobile device and the second mobile device by generating a display on the display device that allows a user to indicate a physical orientation of the second mobile device relative to the mobile device, wherein the user provides an input to the mobile device to indicate the physical orientation of the second mobile device relative to the mobile device; and wherein the application program manages the connections to share an image across display portions of the mobile device and the second mobile device based on the user indication of the physical orientation of the second mobile device relative to the mobile device such that a portion of the image is displayed on the display portions of both mobile devices so that when the mobile devices are placed adjacent one another in the physical orientation indicated by the user of the mobile device, the image is displayed in its entirety.

11. The mobile device of claim 10 where the application program is configured to display on the display to a user a list of mobile devices to connect to.

12. The mobile device of claim 11 wherein the application program displays the list of devices by relative distance.

13. The mobile device of claim 10 wherein the application program displays a grid on the display where each sector of the grid represents a piece of information that can be transmitted.

14. The mobile device of claim 13 wherein each sector of the grid corresponds to a key on the keypad.

15. The mobile device of claim 13 wherein the application program permits navigation through the grid through the use of a pointing device located on the mobile device.

16. The mobile device of claim 15 wherein the pointing device is a scroll wheel.

17. The mobile device of claim 10 wherein the application program is configured to allow a connection for a period of time.

18. The mobile device of claim 17 wherein the connection is held open for as long as a key is pressed on the mobile device.

* * * * *